US008903900B2

(12) United States Patent  
Maurer et al.

(10) Patent No.: US 8,903,900 B2  
(45) Date of Patent: Dec. 2, 2014

(54) MANAGING MAP ELEMENTS USING AGGREGATE FEATURE IDENTIFIERS

(71) Applicant: Google Inc., Mountain View, CA (US)

(72) Inventors: Jennifer Maurer, Seattle, WA (US); Brian Cornell, Kenmore, WA (US); Daniel Otero, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/053,559

(22) Filed: Oct. 14, 2013

(65) Prior Publication Data

US 2014/0035948 A1    Feb. 6, 2014

Related U.S. Application Data

(63) Continuation of application No. 13/244,716, filed on Sep. 26, 2011, now Pat. No. 8,560,600.

(51) Int. Cl.
| | | |
|---|---|---|
| *G06F 12/16* | (2006.01) | |
| *G09B 29/00* | (2006.01) | |
| *G01C 21/36* | (2006.01) | |
| *G06F 17/30* | (2006.01) | |
| *G06T 11/00* | (2006.01) | |
| *G06T 17/05* | (2011.01) | |

(52) U.S. Cl.
CPC .............. *G06T 11/00* (2013.01); *G09B 29/006* (2013.01); *G01C 21/3667* (2013.01); *G06F 17/30241* (2013.01); *G09B 29/007* (2013.01); *G06T 17/05* (2013.01)
USPC ........................................................ 709/203

(58) Field of Classification Search
CPC .................................... G09B 29/007
USPC ........................................................ 709/203
See application file for complete search history.

(56) References Cited

U.S. PATENT DOCUMENTS

| 5,519,809 A | 5/1996 | Husseiny et al. |
| 5,864,632 A | 1/1999 | Ogawa et al. |
| 5,966,135 A | 10/1999 | Roy et al. |
| 6,314,370 B1 | 11/2001 | Curtright |

(Continued)

FOREIGN PATENT DOCUMENTS

| EP | 1 247 209 B1 | 10/2002 |
| EP | 2 078 926 A1 | 7/2009 |
| WO | WO-2007/095184 A2 | 8/2007 |

OTHER PUBLICATIONS

Bing Maps AJAX Control, Version 7.0 (2011).

(Continued)

*Primary Examiner* — Jerry Dennison  
(74) *Attorney, Agent, or Firm* — Marshall, Gerstein & Borun LLP

(57) ABSTRACT

Multiple individually renderable map elements, each representing a respective physical entity in a geographic area, are rendered to generate a digital map of the geographic area. A description of an aggregate map feature that includes several but not all of the multiple map elements is received. The several map elements represent physical entities that form a common administrative unit. A selection of one of the several map elements is received via the user interface. In response to receiving the selection, the several map elements included in the aggregate map feature are automatically selected, and an indication that the aggregate map feature has been selected is provided on the user interface.

20 Claims, 7 Drawing Sheets

(56) References Cited

U.S. PATENT DOCUMENTS

| | | |
|---|---|---|
| 6,388,684 B1 | 5/2002 | Iwamura et al. |
| 6,577,714 B1 | 6/2003 | Darcie et al. |
| 7,142,217 B2 | 11/2006 | Howard et al. |
| 7,308,117 B2 | 12/2007 | Chitradon et al. |
| 7,734,412 B2 | 6/2010 | Shi et al. |
| 7,844,417 B2 | 11/2010 | Du |
| 7,865,301 B2 | 1/2011 | Rasmussen et al. |
| 7,933,897 B2 | 4/2011 | Jones et al. |
| 7,945,546 B2 | 5/2011 | Bliss et al. |
| 8,010,407 B1 | 8/2011 | Santoro et al. |
| 8,014,946 B2 | 9/2011 | Rasmussen et al. |
| 8,041,506 B2 | 10/2011 | Bliss et al. |
| 2002/0113797 A1 | 8/2002 | Potter et al. |
| 2004/0217980 A1* | 11/2004 | Radburn et al. .............. 345/672 |
| 2005/0285876 A1 | 12/2005 | Balaga et al. |
| 2006/0074660 A1 | 4/2006 | Waters et al. |
| 2006/0139375 A1 | 6/2006 | Rasmussen et al. |
| 2006/0170693 A1 | 8/2006 | Bethune et al. |
| 2006/0197781 A1 | 9/2006 | Arutunian |
| 2006/0271281 A1 | 11/2006 | Ahn et al. |
| 2006/0293847 A1 | 12/2006 | Marriott et al. |
| 2007/0016651 A1 | 1/2007 | Blagsvedt et al. |
| 2007/0021908 A1 | 1/2007 | Jaugilas et al. |
| 2007/0050340 A1 | 3/2007 | von Kaenel et al. |
| 2007/0118520 A1 | 5/2007 | Bliss et al. |
| 2007/0176796 A1 | 8/2007 | Bliss et al. |
| 2007/0208498 A1 | 9/2007 | Barker et al. |
| 2007/0210937 A1 | 9/2007 | Smith et al. |
| 2007/0226314 A1 | 9/2007 | Eick et al. |
| 2007/0245238 A1 | 10/2007 | Fugitt et al. |
| 2008/0016472 A1 | 1/2008 | Rohlf et al. |
| 2008/0109159 A1 | 5/2008 | Shi et al. |
| 2008/0238941 A1 | 10/2008 | Kinnan et al. |
| 2009/0089149 A1* | 4/2009 | Lerner et al. .............. 705/10 |
| 2009/0113296 A1 | 4/2009 | Lacy et al. |
| 2009/0198767 A1 | 8/2009 | Jakobson et al. |
| 2009/0271718 A1 | 10/2009 | Balaishis et al. |
| 2010/0073391 A1 | 3/2010 | Horowitz et al. |
| 2010/0114941 A1 | 5/2010 | von Kaenel et al. |
| 2010/0118025 A1 | 5/2010 | Smith et al. |
| 2010/0194784 A1 | 8/2010 | Hoff et al. |
| 2010/0201707 A1 | 8/2010 | Rasmussen et al. |
| 2010/0321399 A1 | 12/2010 | Ellren et al. |
| 2011/0004830 A1 | 1/2011 | Von Kaenel et al. |
| 2011/0063301 A1* | 3/2011 | Setlur et al. .............. 345/441 |
| 2011/0153186 A1 | 6/2011 | Jakobson |
| 2011/0172909 A1 | 7/2011 | Kahn et al. |
| 2011/0191014 A1 | 8/2011 | Feng et al. |
| 2011/0208724 A1 | 8/2011 | Jones et al. |
| 2011/0267369 A1 | 11/2011 | Olsen |
| 2011/0306304 A1 | 12/2011 | Forutanpour et al. |
| 2012/0197524 A1 | 8/2012 | Beyeler et al. |
| 2013/0080504 A1* | 3/2013 | Maurer et al. .............. 709/203 |

OTHER PUBLICATIONS

Bing Services, "Getting Started with V4 of the API (Part 1)," Microsoft (2011). Retrieved from the Internet on Sep. 26, 2011: URL:http://msdn.microsoft.com/en-us/library/aa907678.aspx.

Neoseeker, "Bing Maps Combines Raster Tiles and Vector Graphics for Enhanced Experience," Neo Era Media Inc. (1999-2011). Retrieved from the Internet on Sep. 26, 2011: URL:http://www.neoseeker.com/news/14507-bing-maps-combines-raster-tiles-and-vector-graphics-for-enhanced-experience.

Sample et al., "Tile-Based Geospatial Information System: Principles and Practices," pp. xi-xiv, 193-203 (Springer 2010).

International Search Report and Written Opinion for Application No. PCT/US2012/057099, dated Feb. 27, 2013.

\* cited by examiner

MANAGING MAP ELEMENTS USING AGGREGATE FEATURE IDENTIFIERS

CROSS-REFERENCE TO RELATED APPLICATIONS

This application is a continuation of U.S. application Ser. No. 13/244,716, titled "Managing Map Elements Using Aggregate Feature Identifiers," filed on Sep. 26, 2011, the entire disclosure of which is hereby incorporated by reference herein.

FIELD OF THE DISCLOSURE

The present disclosure relates to map rendering systems, such as electronic map display systems, and more specifically to a map rendering system in which map images are rendered using map data that includes discrete map elements.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, maps of geographic regions may be displayed by software applications running on a wide variety of devices, including mobile phones, car navigation systems, hand-held global positioning system (GPS) units, and computers. Depending on the application and/or user preferences, maps may display topographical data, street data, urban transit information, traffic data, etc. Further, some applications display maps in an interactive mode, so that a user may operate various controls (radio buttons, scrollbars, etc.) to change the zoom level or pan the "camera" to a new location, for example. A user in some cases also may select or unselect the display of certain information. For example, the user may operate the appropriate control to turn on the display of bicycle trails.

To render a map image, a client device typically receives raster images from a dedicated server. For example, a map server may operate on the Internet and provide images in a Portable Network Graphics (PNG) format to various client devices for the specified geographic regions. While raster images are relatively easy to render at a client device, raster image data typically requires a large amount of storage space for a comprehensive map. Also, it is difficult to efficiently manipulate raster images at a client device. For example, to zoom in on a selected region, either new raster image data is retrieved from the server, or the available raster image data is enlarged with a noticeable loss in quality. Further, to change the visual properties of a map image, the client device must request new raster image data from the map server.

SUMMARY

In an embodiment, a computer-implemented method for providing map data to a client device via a communication network includes generating map data that conforms to a non-raster format and is for rendering a raster map image of a geographic area at the client device. The raster map image includes several map elements, each corresponding to a respective physical entity or a portion of a physical entity in the geographic area. The method also includes generating a description of a map feature that includes two or more of the several map elements and does not include at least one of the several map elements, where the map elements included in the map feature correspond to related physical entities or portions of a same physical entity. Generating a description of the map feature includes providing an indication of a portion of the map data that corresponds to the map feature and providing a map feature identifier that uniquely identifies the map feature. The method further includes causing the map data and the description of the map feature to be transmitted to the client device via a communication network.

In another embodiment, a computing device operating on a communication network includes a map data generator and a map feature controller. The map data generator generates map data for rendering a raster map image of a geographic area at a client device, where the map data specifies multiple geometric shapes according to a non-raster format, and where the raster map image depicts several physical entities in the geographic area. The map feature controller generates a description of a map feature that corresponds to a group of two or more physical entities selected from the several physical entities or to two or more portions of one of the physical entities, where the map feature does not correspond to at least one of the several physical entities, and where to generate the description of the map feature, the map feature controller provides an indication of a portion of the map data that corresponds to the map feature and provides a map feature identifier that uniquely identifies the map feature. The computing device causes the map data and the description of the map feature to be transmitted to the client device via the communication network.

In another embodiment, a method in a computing device for providing interactive map content includes receiving, via a communication network, map data for a geographic area that conforms to a non-raster format. Receiving the map data includes receiving several descriptors, each specifying a geometric shape of a respective one of several map elements, where each descriptor is independently interpretable to render a corresponding map element. The method further includes receiving a description of a map feature that includes two or more of the several map elements and does not include at least one of the several map elements, such that the map elements included in the map feature correspond to related physical entities in the geographic area or portions of a unitary physical entity. Further, receiving a description of the map feature includes receiving an indication of which of the several map elements are associated with the map feature. The method also includes interpreting the map data to generate a raster map image to be displayed via a user interface, including rendering the plurality of map elements, and providing, via the user interface, an indication that the two or more of the plurality of map elements are associated with the map feature.

DETAILED DESCRIPTION

Figure 1:
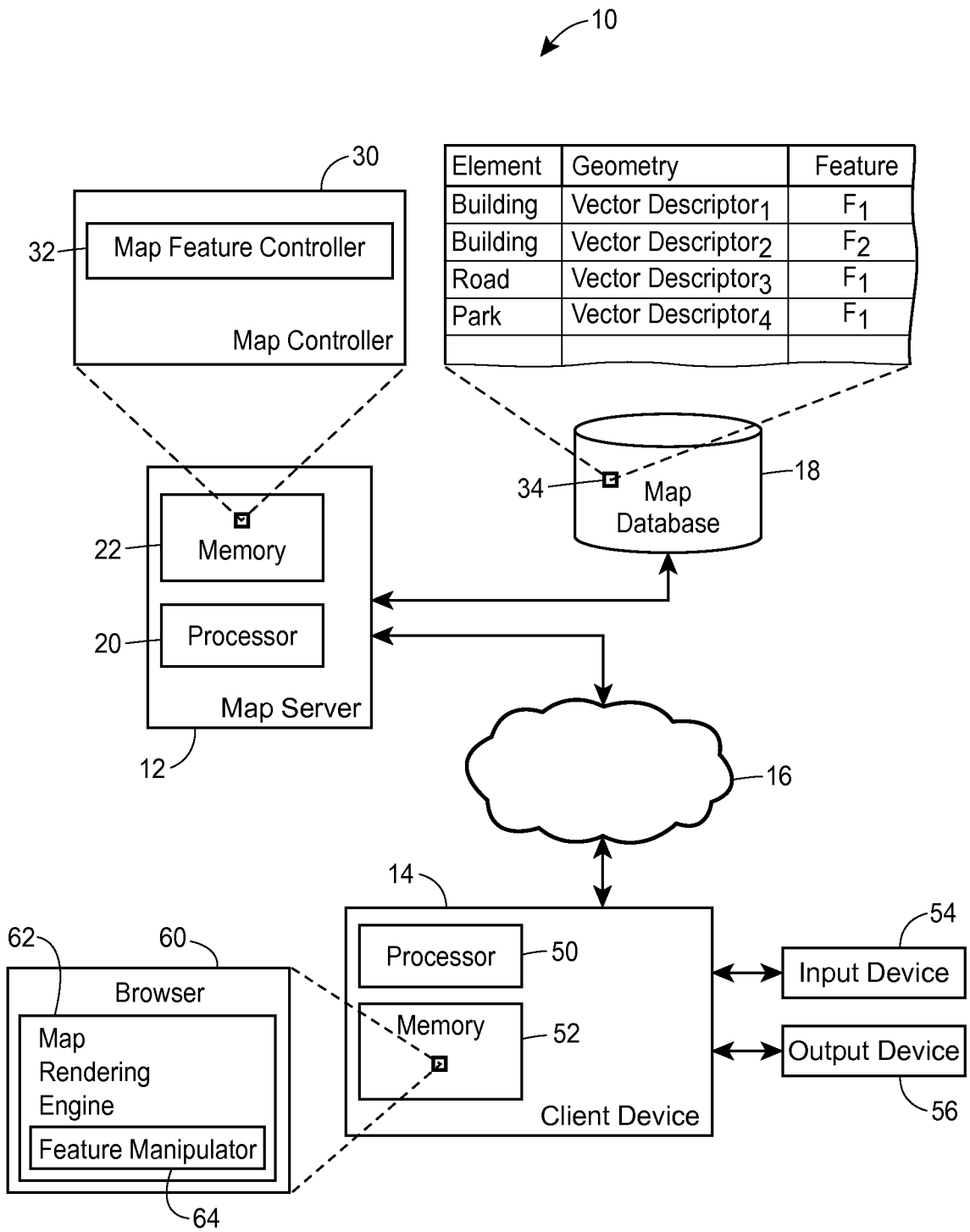
FIG. 1 is a block diagram of a system in which a map server having a map controller provides, to a client device, map data for rendering a map image and a description of a map feature that aggregates several map elements rendered as portions of the map image, according to an embodiment.

Generally speaking, a map server provides map data in a non-raster format to a client device for rendering a raster map image, depicting various map elements such as buildings, parks, fields, bodies of water, segments of roads, bicycle trails, and pedestrian paths, and also provides a description of at least one aggregate map feature having several separate map elements that correspond to a common administrative unit or are otherwise logically related. The non-raster format may be a vector graphics format, for example. The map server may provide an indication of what portion of the map data corresponds to the aggregate map feature so as to allow users of the client device to efficiently select and manipulate multiple map elements associated with the aggregate map feature. In this manner, the user can refer to the aggregate map feature to automatically highlight, remove, add, and update visual characteristics of the various map elements that make up the aggregate map feature. The map server also may provide a unique map feature identifier which the map server and the client device may utilize to refer to the aggregate map feature in subsequent communications. More particularly, using the map feature identifier, the client device may request additional information related to the aggregate map feature, such as map data for rendering additional map elements that become visible at a new zoom level or when a new type of a map is selected. Further, the map server may use the map feature identifier when providing the client device with visual style data, i.e., information related to visual attributes of map elements such as line thickness, line color, fill color, etc.

An aggregate map feature may correspond to an academic institution such as university, a commercial entity such as a shopping mall, a business entity such as a corporation, a factory, or a plant, a hospital complex, a residential subdivision, or anything else that includes related physical entities in a geographic region. In some cases, an aggregate map feature may correspond to several portions of a same physical entity if, for example, the physical entity is represented by multiple map elements provided in different map tiles (as discussed in more detail below). In general, a map feature may be aggregate with multiple map elements or non-aggregate with only one map element. For example, a map server may provide a vector-based description of a building as a certain map feature that can be individually interpreted and rendered at a client device, added or removed independently of other map elements when updating the zoom level or the map type, assigned an individual label, etc. On the other hand, an aggregate map feature may include several map elements of the same type (e.g., a complex of several buildings) or different types (e.g., a building, a park, and a pedestrian path). Further, an aggregate map feature in some scenarios has a "nested" structure and includes one or several map features having multiple map elements. For example, in some embodiments, each map element defines a respective map feature, certain groups of map features are aggregated into larger aggregate map features, and some of the larger map features are aggregated into still larger aggregate map features. Still further, an aggregate map feature may include map elements rendered in separate map tiles, or portions of a map image of a certain size.

For clarity, map features that include only one map element may be referred to herein as map elements. Also, because the discussion below primarily concerns aggregate map features that have multiple map elements, such map features sometimes may be referred to below simply as map features.

Referring to FIG. 1, techniques for providing map and map feature data to a client device, as well as using the provided data at the client device to efficiently manipulate map features, may be implemented in a system 10. In an embodiment, the system 10 includes a map server 12, a client device 14 communicatively coupled to the map server 12 via a network 16, and a map database 18 communicatively coupled to the map server 12. The network 16 may be a wide area network (WAN) such as the Internet, a local area network (LAN), or any other suitable type of a network. To provide map and feature data to the client device 15, the map server 12 may generate electronic messages and transmit these messages via the network 16. Depending on the embodiment, the map database 18 may be coupled to the map server 12 via the network 16 or via another communication link as illustrated in FIG. 1. For simplicity, only one instance of the map server 12, the client device 14, and the map database 18 is illustrated in FIG. 1. However, in other embodiments, the system 10 may include more than one map server 12, more than one client device 14, and/or more than one map database 18. For example, in some embodiments, the map server 12 provides map data to various client devices 14 including desktop computers, portable computers, tablet computers, smartphones, etc.

The map server 12 may include a processor 20 and a computer-readable memory 22 that stores a map controller 30 in the form of computer instructions, for example, that may be executable on the processor 20 directly (e.g., as compiled code) or indirectly (e.g., as a script interpreted by another application executing on the processor 20). The computer-readable memory 22 may include volatile memory to store computer instructions and data on which the computer instructions operate at runtime (e.g., Random Access Memory or RAM) and, in an embodiment, persistent memory such as a hard disk, for example. In some embodiments, the map server 12 includes multiple processors 20. Further, in some embodiments, the map controller 30 may be implemented using hardware components, firmware components, software components, or any combination thereof.

In an embodiment, the map controller 30 generates a description of various map elements for a selected geographic region in a non-raster format, such as a vector graphics format, to be provided to the client device 14 as map data. In general, vector-based map data may specify various geometric shapes (e.g., using mathematical descriptions of points and paths connecting the points) and indicate how these shapes should be positioned for rendering various map elements such as roads, buildings, parks, bodies of water, etc. For example, rather than specifying each pixel that makes up a raster image of a line segment, a vector-based description of the line segment may specify the two endpoints of the line segment and indicate that the two endpoints are connected by a straight line. Vector-based descriptions of map elements may be referred to herein as vector descriptors or simply vectors, and a set of one or several vector descriptors may be referred to as vector data. In general, a map element may be described using a certain vector descriptor. As discussed in more detail with reference to FIG. 2, the map controller 30 may generate a vector-based description of a geographic region in view of a zoom level at which a map of the geographic region is to be rendered at the client device, a map type (e.g., terrain, traffic, transit, etc.) according to which the map is rendered at the client device, previously provided map data, etc. Also, in some embodiments, the map server may provide vector data that describes map content separately from style data that indicates how the vector data should be rendered.

The map controller 30 may include a map feature controller 32 that generates descriptions of map features having one or several map elements. In an embodiment, the map feature controller 32 generates indications of which vector descriptors (and, accordingly, which map elements) correspond to a certain map feature. For example, the map feature controller 32 may generate a message that includes a field that specifies an aggregate feature identifier of an aggregate map feature, followed by a listing of map features to which the aggregate feature identifier pertains. The listing of map features may include vector descriptors and/or label data. Alternatively, the listing of map features may include respective feature identifiers. In either case, when parsing the message, the client device 14 can determine that the map features included in the list are associated with the same aggregate feature identifier. To determine which portion of the map data (e.g., which set of the vector descriptors) is associated with a certain map feature, the map feature controller 32 may use a map content table 34 for the appropriate geographic region, stored in the map database 18.

With continued reference to FIG. 1, the map content table 34 may include records for individual map elements such as buildings, roads, parks, etc. For each map element, the map content table 34 may provide a vector descriptor that specifies the geometric shape of the map element. In an embodiment, the map content table 34 also provides additional information such as style data (which in turn may specify multiple visual styles for rendering the map element according to different map types), depth indication to indicate whether the map element is rendered over or under another overlapping map element, label information, zoom data to indicate at which zoom levels the map element becomes visible or stops being visible, etc. The map content table 34 also may indicate with which map features, if any, a map element is associated. For example, in the fragment of the map content table 34 illustrated in FIG. 1, a map element of the type Building, a map element of the type Road, and a map element of the type Park are described by different vector descriptors but are associated with the same map feature $F_1$.

The map controller 30 may provide map data to the client device 14 for a certain geographic region (as well as a certain zoom level and/or a certain map type, according to an embodiment) in a single electronic message or a series of electronic messages, depending on the embodiment. Further, in an embodiment, the map controller 30 generates map data as a set of map tile descriptors, such that each map tile descriptor describes a map tile, i.e., a portion of a map image of a certain size (e.g., 256 by 256 pixels). The size of a geographic region represented by an individual map tile may depend on the zoom level with which the map tile is associated. In general, the zoom level corresponds to the apparent distance to a map image or a portion of the map image (e.g., as a result of changing the elevation of the viewpoint). In an embodiment, a single map tile at a lower zoom level illustrates a larger geographic area than a single map tile at a higher zoom level. The map controller 30 may generate each map tile descriptor according to a vector graphics format, and a client device, such as the client device 14 of FIG. 1, may locally generate a raster image that includes one or several tiles. In some scenarios, map elements of a map feature may be provided in different map tiles. For example, the map controller 30 may generate several map elements corresponding to respective portions of a single physical entity, such as a building, if the map elements are provided in separate map elements.

Still referring to FIG. 1, the client device 14 may include a processor 50 to execute instructions and a memory 52 to store instructions and data. The client device 14 also may include an input device 54 and an output device 56 to receive input from a user and provide output to the user, respectively. The input device 54 may include one or more of a keyboard, a mouse, and a touchscreen, and the output device 56 may include a touchscreen or another type of a monitor, for example. The client device 14 may include various software components, such as device drivers, operating system (OS) event handlers, etc. to control the input device 54 and the output device 56 so as to implement an interactive user interface. Further, software applications executing on the processor 50 may utilize these software components to provide an application-specific user interface.

Depending on the embodiment, the client device 14 may be a personal computer, such as a desktop computer, a laptop computer, or a tablet PC, a workstation, a portable communication device such as smartphone, or any other suitable computing device. In an embodiment, the client device 14 is a so-called thin client that depends on another computing device for certain computing and/or storage functions. For example, in one such embodiment, the memory 52 includes only volatile memory such as RAM, and a program and/or storage unit having persistent memory is external to the client device 14. In another embodiment, the memory 52 includes both volatile and persistent memory components.

A browser application 60 may include a set of computer-readable instructions that execute on the processor 50. In general, the browser application 60 accesses web pages that include content such as text, images, embedded video, etc. and instructions in a mark-up language such as Hypertext Markup Language (HTML), and renders the content on the output device 56 according to the instructions in the mark-up language. To this end, the browser application 60 may implement functions for generating and processing data packets that conform to the Hypertext Transfer Protocol (HTTP), parse HTML content, encode data according to the Secure Socket Layer (SSL) protocol, request and verify digital certificates, etc., as well as user interface functions for receiving various user commands related to navigation, rendering, and managing web page data. In some embodiments, the browser application 60 is configured to interpret instructions in a scripting language (e.g., Javascript) provided in a web page.

A map rendering engine 62 may execute as a component of the browser application 60. However, in other embodiments, a software module similar to the map rendering engine 62 may execute as a standalone application or as a component of another application. Depending on the embodiment, the map rendering engine 62 may be a plugin (e.g., a set of compiled instructions that extends the functionality of the browser application 60 and executes on the processor 50), a script (e.g., a set of instructions in a scripting language interpreted by the browser application 60 at runtime), or another suitable software component. According to one example scenario, the map rendering engine 62 is downloaded when a user operating the client device 14 visits a web page that includes an embedded interactive map. More specifically, the web page may include a first hyperlink to an online map server and a certain geographic location as well as a second hyperlink to a copy of the map rendering engine 62, which is required for rendering map data received from the online map server according to the first hyperlink. The map rendering engine 62 may receive vector data (and, in some embodiments, style data) from the map server 12, render the corresponding map image using the received vector data, and cause the map image to be displayed within a certain region allocated by the browser application 60. For example, the browser application 60 may create an HTML5 Canvas element for displaying map images.

Further, the map rendering engine 62 may provide interactive controls via the user interface of the browser application 60, for example. The interactive controls may allow a user to select a geographic region or area, a map type (e.g., basic, traffic, transit), a zoom level, etc. Further, in an embodiment, the map rendering engine 62 includes a feature manipulator 64 that provides interactive user controls for selecting aggregate map features in addition to individual map elements (or non-aggregate map features). For example, the map feature manipulator 64 may provide additional buttons and/or recognize additional keystroke events for manipulating map features that have multiple map elements. The feature manipulator 64 may process map feature descriptions received from the map server 12 and, in response to determining that a user has chosen to select a certain map feature, automatically identify and select map elements associated with the map feature. As a more specific example, the user may click on an individual map element depicted on a map, and the feature manipulator 64 may determine that the map element is associated with an aggregate map feature having multiple map elements and highlight the entire map feature, i.e., the clicked-upon map element as well as one or more additional map elements on which the user did not click. As another example, the feature manipulator 64 may determine that a mouse pointer "hovers" over a map element associated with an aggregate map feature and, similar to the scenario described above, automatically highlight the entire map feature that includes the map element. More generally, the feature manipulator 64 can process mouse events or events from another suitable device to support hover, touch, and other types of user interaction.

For simplicity, the client device 14 is illustrated with a single processor 50. However, the client device 14 in other embodiments may include additional processing units (not shown) such as a graphics processing unit (GPU) configured to facilitate image rendering on the output device 56, for example. Further, in an embodiment, the browser application 60 may utilize a library of graphics functions for efficiently generating a map image. For example, the browser application 60 may utilize a software library that supports 3D graphics, such as WebGL, for example. As another example, the memory 52 may store a plugin, such as an OpenGL® or Direct3D® library, having functions for rendering graphics which various applications executing on the client 14, including the browser application 60, may access via an application programming interface (API). Also, in some embodiments, the memory 52 stores additional software components that facilitate efficient rendering of images via the output device 56. For example, the memory 52 may store an Adobe® Flash® plugin or an O3D plugin.

It is noted that in addition, or as an alternative, to the browser application 60, the map rendering engine 62 can operate in any suitable application such as a mapping application. Similar to the browser application 60, the mapping application may include a set of instructions stored in a memory 52 and executable on one or more processors of the client device 14 or a similar device. In some implementations, the mapping application utilizes networking functions provided by the browser application 60 (via a corresponding browser API, for example). In another implementation, the mapping application includes at least partial browser functionality, such as the communication stack that supports TCP, IP, HTTP, etc. to access the map server 12.

Figure 2:
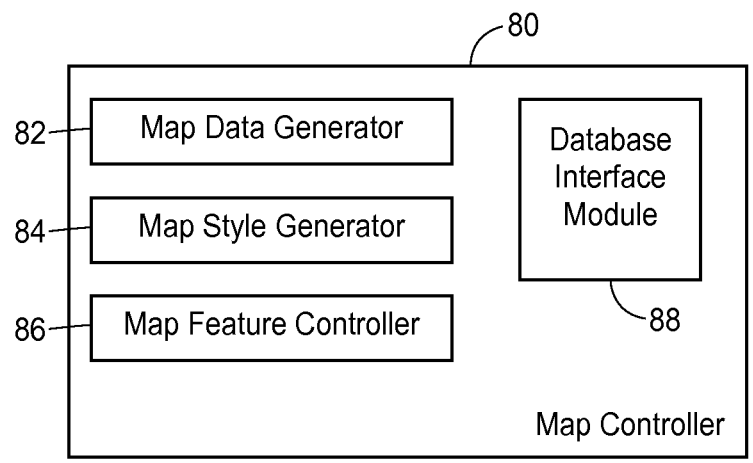
FIG. 2 is a block diagram of an example map controller that may operate in the system of FIG. 1.

Now referring to FIG. 2, the map controller 80 may operate, for example, in the map server 12 of FIG. 1 as the map controller 30, or in another device configured to provide map data to one or several client devices. The map controller 80 may include several components implemented as software modules (e.g., computer instructions stored on a computer-readable medium and interpretable by one or several processors), hardware modules, firmware modules, or any suitable combination thereof. Generally speaking, the map controller 80 may be configured to process requests from client devices, such as the client device 14, for map data corresponding to a specified geographic region. For example, the map controller 80 may receive a request for map data corresponding to a two-mile-wide region centered at latitude 41° 52' 43" and longitude −87° 38' 11". The request may also indicate a zoom level for which map data is being requested. The request may also indicate the map type, e.g., basic, traffic, transit, etc.

In an embodiment, the map controller 80 includes a map data generator 82, a style generator 84, a map feature controller 86, and a database interface module 88 to provide communications between a repository of map data, such as the map database 18 of FIG. 1, and components 82, 84, and 86. During operation, the map data generator 82 generates vector-based map data for various map elements that are provided as map content to the client device 14, for example. To this end, the map data generator 82 may communicate with a map server via the database interface module 88. The map data generator 82 may generate vector descriptors that specify the geometry of map elements and, in some cases, may also provide label data, depth indication, and other parameters as parts of (or in addition to) the map data. In some embodiments, the map data generator 82 generates map data as a set of map tile descriptors, such that each map tile descriptor describes a map tile, according to an embodiment. The size of a geographic region represented by an individual map tile depends on the zoom level with which the map tile is associated, so that a single map tile at a lower zoom level illustrates a larger geographic area than a single map tile at a higher zoom level. The map data generator 82 may generate each map tile descriptor according to a vector graphics format, and a client device may locally generate a raster image for the geographic region corresponding to one or several tiles. Although each tile may be rendered separately and independently of each other, the map data generator 82 in some embodiments renders multiple tiles together to generate a single raster image.

Further, the map style generator 84 may generate style data for application to map content at a client device. Styles in general may be identified by respective unique style identifiers, and each style may correspond to one or several visual styles for rendering map elements. The visual styles may in turn specify the visual characteristics to be used when rendering vector-based map data. The map style generator 84 may provide style data on a per-feature-type basis. For example, the map data generator 82 may provide vector data for each building as a map feature of type Building, and the map style generator 84 may provide style data which a client device applies to all vector descriptors that correspond to map features of this type.

The map feature controller 86 may generate descriptors of map features to be provided to a client device along with the corresponding map data. Similar to the map feature controller 32 discussed above, the map feature controller 86 may be configured to generate an indication of which portion of non-raster map data corresponds to a particular map feature. The map feature controller 86 also be configured to generate unique map feature identifiers for use at the client device and/or the device in which the map controller 80 is implemented. In some embodiments, the map feature controller 86 provides flags or other indicators for each vector descriptor associated with the map feature. For example, a vector descriptor may be a data structure with a feature_identifier field that specifies to which map feature, if any, the map element specified by the vector descriptor belongs. Because an aggregate map feature may include several map features, each having a respective feature identifier, the map feature controller 86 also may provide additional data to indicate how individual map features are grouped into an aggregate map feature. For example, the map feature controller 86 may populate a field feature_identifier with the identifier of the non-aggregate map feature and also populate a field aggregate_feature_identifier with the identifier of the corresponding aggregate map feature.

In other embodiments, the map feature controller 86 specifies the boundary of a map feature region that encompasses all map elements associated with the map feature. The boundary may be specified in any suitable manner such as a set of latitude/longitude tuples, a polygon in a vector graphics format, etc. The boundary of the map feature region in many cases does not coincide with the boundaries of map tiles. Moreover, the map feature region may encompass map elements in multiple map tiles.

Further, the map feature controller 86 in some scenarios generates a common text label (e.g., an alphanumeric string) that is displayed with the map feature at a client device. It is noted that in some cases, map elements that make up the map feature are also associated with individual labels. Still further, the map feature controller 86 may provide, to a client device, style information common to some or all map elements or features associated with an aggregate map feature. For example, the map feature controller 86 may generate an indication that for a certain aggregate map feature $MF_1$ rendered as part of a transit map, all associated map elements are displayed at a client device using style $S_1$, which corresponds to a visual style $VS_1$ for the transit map type, and provide this indication to the client device. In this manner, map elements of different types (e.g., building, roads, parks) can be displayed using similar line thickness, color, etc. In another embodiment, the map feature controller 86 specifies a common style for an aggregate map feature that is used only when the map feature is highlighted at the client device. When some of the map features that make up an aggregate map features are associated with certain map feature types, the client device may apply the style to a vector descriptor in accordance with the corresponding map feature type when the aggregate map feature is not highlighted, and apply the style specified for the aggregate map feature when the map feature is highlighted.

According to some embodiments, after the map controller 80 provides map data to a client device for rendering a first map image (e.g., a basic map image) corresponding to a certain area or geographic region, the map server provides modification data to the client device for rendering a second, different map image (e.g., a traffic map image) corresponding to the same area. The client device then may render the second map image using the map data previously provided for rendering the first map image and the modification data, and the map server need not necessarily provide map data used in rendering both the first map image and the second image to the client device more than once. Depending on the scenario, the modification data may include one or more additions to the previously provided map data in the form of new vector descriptors, deletions of one or several portions of the previously provided map data (which may be identified using feature identifiers), or modifications of one or several portions of the previously provided map data (which also may be identified using feature identifiers). In some of these cases, the vector descriptors being added may include identifiers of aggregate map features. Further, the feature identifiers for the map features being deleted may identify aggregate map features to efficiently remove multiple map elements using only a single feature identifier.

Next, several examples of a map that depicts an aggregate map feature corresponding to a group of related physical entities in a geographic area are discussed with reference to FIGS. 3A-3C. In particular, an example map feature including several buildings, a field, and pedestrian pathways of a university is discussed with reference to FIG. 3A, an example division of a raster map image into several map tiles is illustrated in FIG. 3B, and an example selection of several components of a map feature is illustrated in FIG. 3C. Referring back to FIG. 1, the map rendering engine 62 may generate the map image of FIGS. 3A-3C using map data provided by the map controller 30, for example.

Figure 3A:
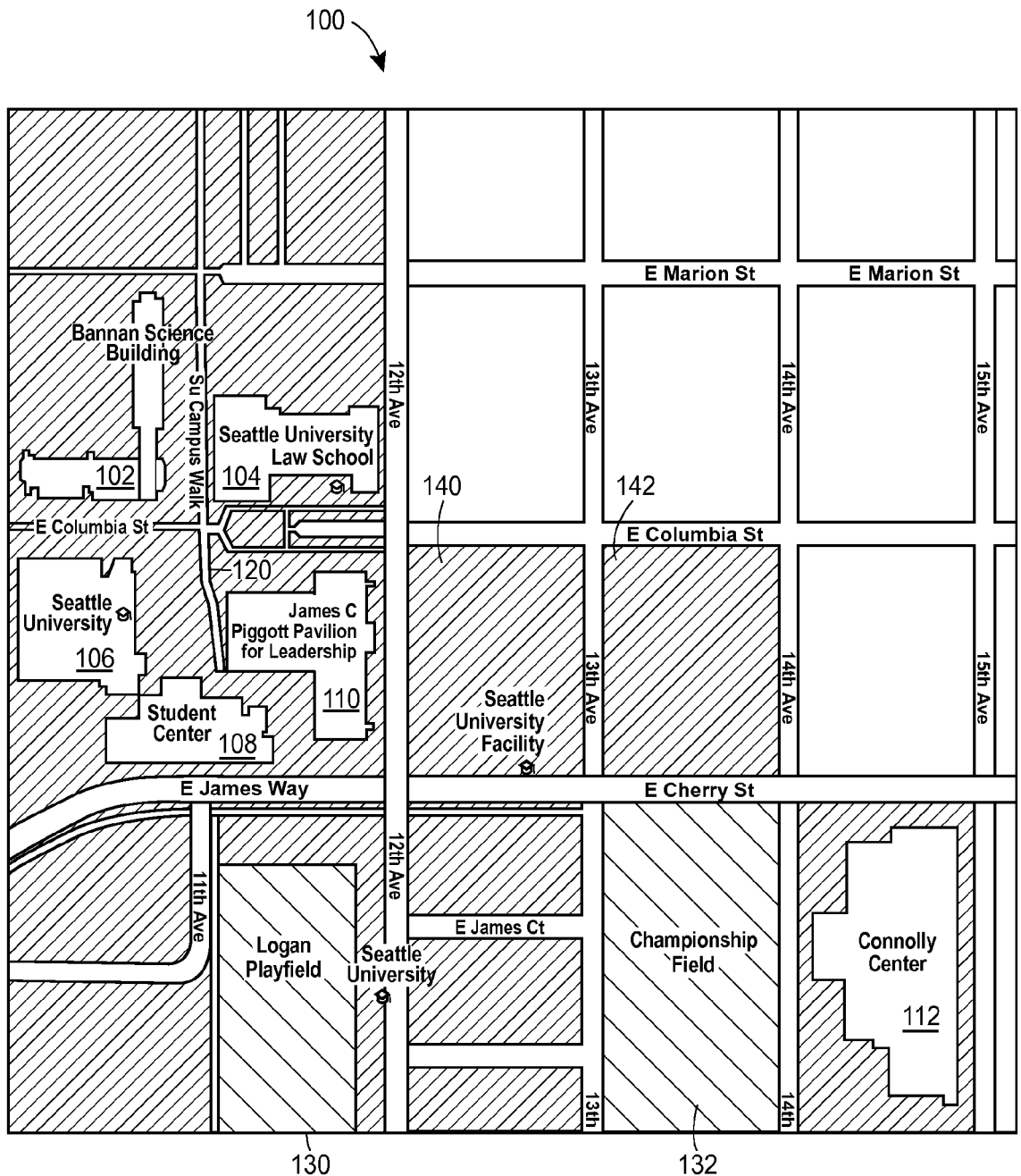
FIG. 3A is an example map with a map feature including several buildings, a field, and pedestrian pathways, that may be displayed at a client device operating in the system of FIG. 1.
Figure 3B:
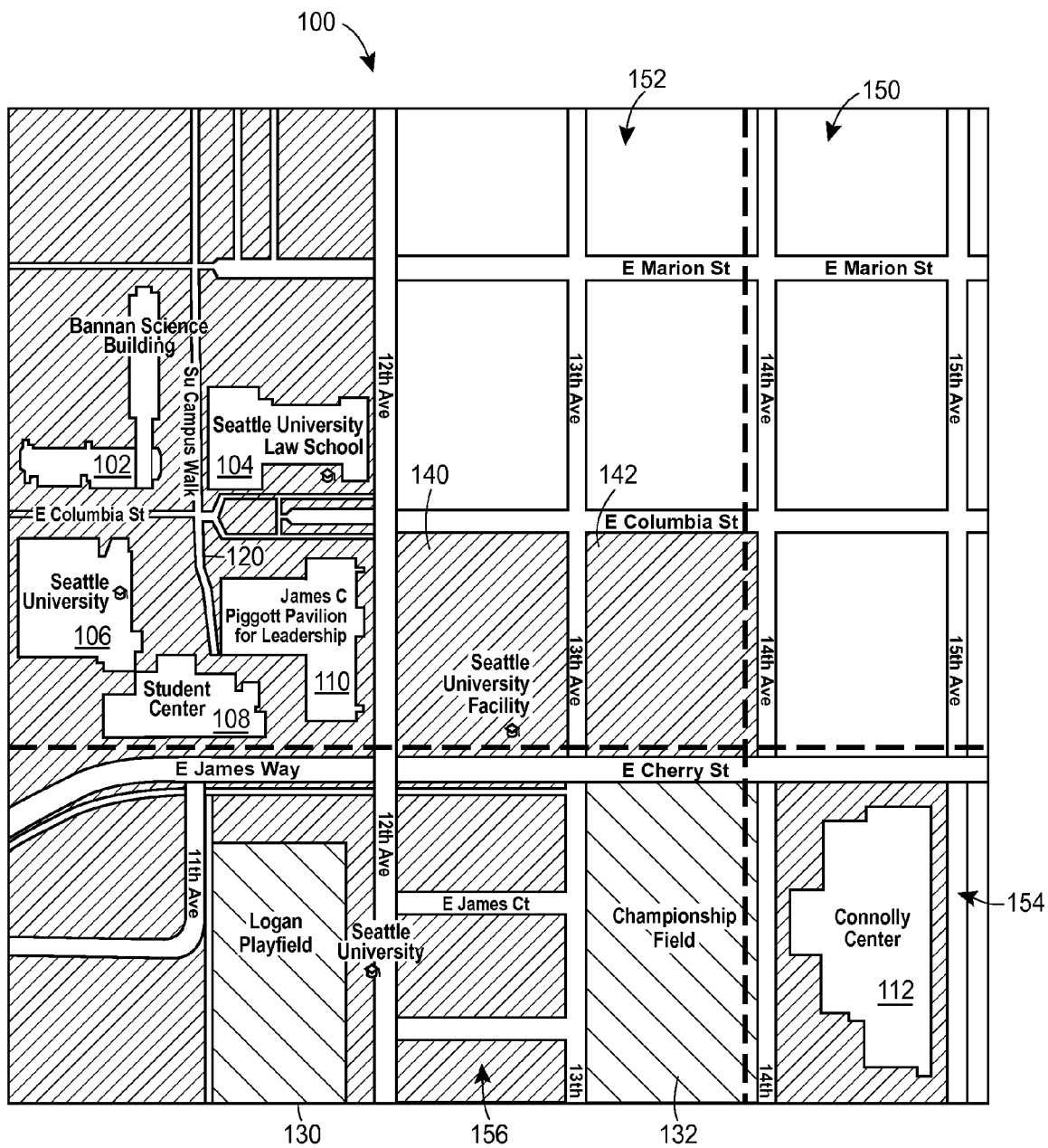
FIG. 3B is the map of FIG. 3A that may be rendered as raster map image made up of several map tiles, where the map feature includes map elements rendered in different map tiles.
Figure 3C:
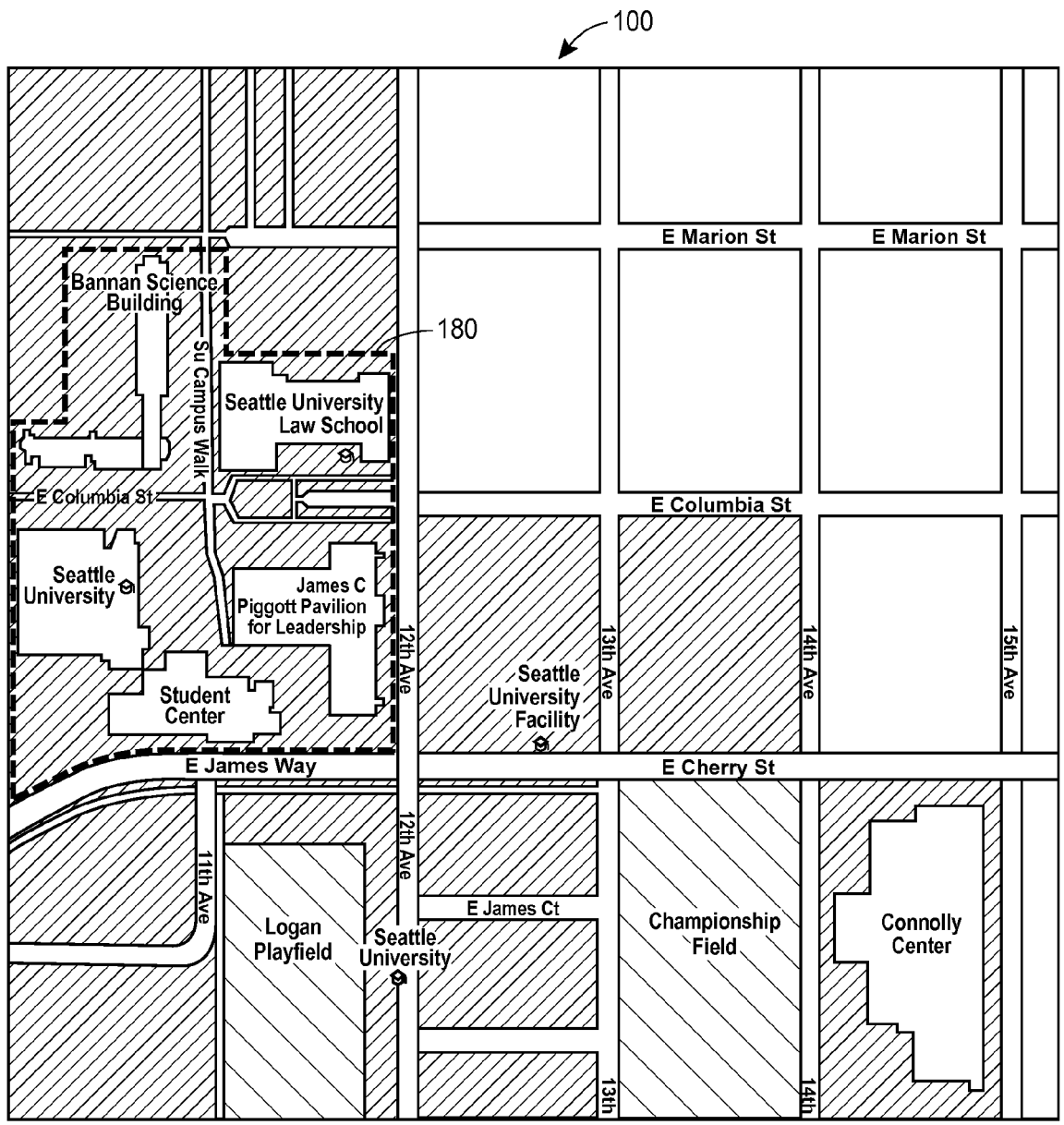
FIG. 3C is the map of FIG. 3A, in which several map elements are automatically selected as components of a map feature.

Referring first to FIG. 3A, a map image 100 depicts several city blocks in Seattle, Wash., some of which belong to Seattle University. More specifically, the map image 100 depicts several map elements such as university buildings 102, 104, 106, 108, and 110 interconnected by pedestrian paths 120. The university also includes several athletic and/or recreational structures 112, 130, and 132, separated from the buildings 102-110 by city streets. In an embodiment, the map elements 102-132 are described by separate vector descriptors, so that each of the map elements 102-132 can be rendered individually and independently of every other map element. Further, the vector descriptors may define respective non-aggregate map features, at least some of which may be associated with individual labels (e.g., "Student Center"). The blocks 140 and 142 also are associated with Seattle University, and are rendered using a color or shading different from the color or shading applied to adjacent city blocks that are not associated with Seattle University. However, the blocks 140 and 142 do not include structures, parks, or other physical entities that are individually illustrated, at least at the zoom level to which the map image 100 corresponds. In an embodiment, various city blocks, including the blocks 140 and 142, are provided in the form of vector descriptors that specify polygons that enclose the respective areas.

In addition to the map data that describes the geometric shapes depicted in the map image 100, a client device may receive an indication that map elements 102-142 are associated with an aggregate map feature. To this end, a common feature identifier may be provided for each vector descriptor corresponding to the map elements 102-142. In another embodiment, vector descriptors corresponding to the map elements 102-142 are provided in a block of data including a header and/or a trailer portion having an indication that the vector descriptors correspond to a common map feature. Generally speaking, any suitable technique for indicating that the map elements 102-142 are associated with an aggregate map feature can be used.

According to an example scenario, the aggregate map feature corresponding to Seattle University has map elements in various map tiles. For example, as illustrated in FIG. 3B, the map image 100 may be made up of map tiles 150, 152, 154, and 156. Each of the map tiles 150-156 may be a portion of a raster image generated using the map data. In an example implementation, map data is grouped according to map tiles when transmitted to the client device. The client device may be configured to render each map tile independently of other map tiles. Alternatively, the client device receives map data corresponding to multiple tiles and, rather than rendering each map tile separately as a corresponding raster image, the client device may generate a single raster image corresponding to multiple map tiles. In the example of FIG. 3B, the map elements 102-110, 120, 140, and 142 are provided in the map tile 152, the map elements 130 and 132 are provided in the map tile 156, and the map element 112 is provided in the map tile 154. When generating a raster image corresponding to multiple map tiles, the client device may retain the association between map elements provided in the map tiles and aggregate features, so that the user can select and manipulate an aggregate map feature that spans multiple map tiles.

Further, an aggregate map feature in some cases may include map elements that correspond to portions of a same unitary physical entity such as a building, a park, a lake, etc. For example, two-thirds of a representation of a certain building may be provided as a first map element in one map tile, and the remaining third of the representation of the building may be provided as a second map element in another map tile. A map server in this scenario may generate separate descriptions of the two map tiles, with each of the map tiles including the corresponding map element, and transmit these descriptions to the client device. However, to allow the client device to present the first map element and the second map element as a single map element via the user interface of the client device, the map server also may generate a description of an aggregate map feature that includes the first map element and the second map element.

Further, in an embodiment, grouping of map elements or features into aggregate map features may be implemented at multiple levels. For example, as illustrated in FIG. 3C, several but not all map elements associated with Seattle University may correspond to a map feature 180. In the example illustrated in FIG. 3A, the description of the map feature 180 specifies the boundaries of a geographic region that contains the corresponding map elements (which may be the elements 102-119 and 120 discussed above with reference to FIGS. 3A and 3B). In an example scenario, a user clicks on the map next to the building labeled Student Center, and the area enclosed by the boundaries of the map feature 180 is selected.

Figure 4:
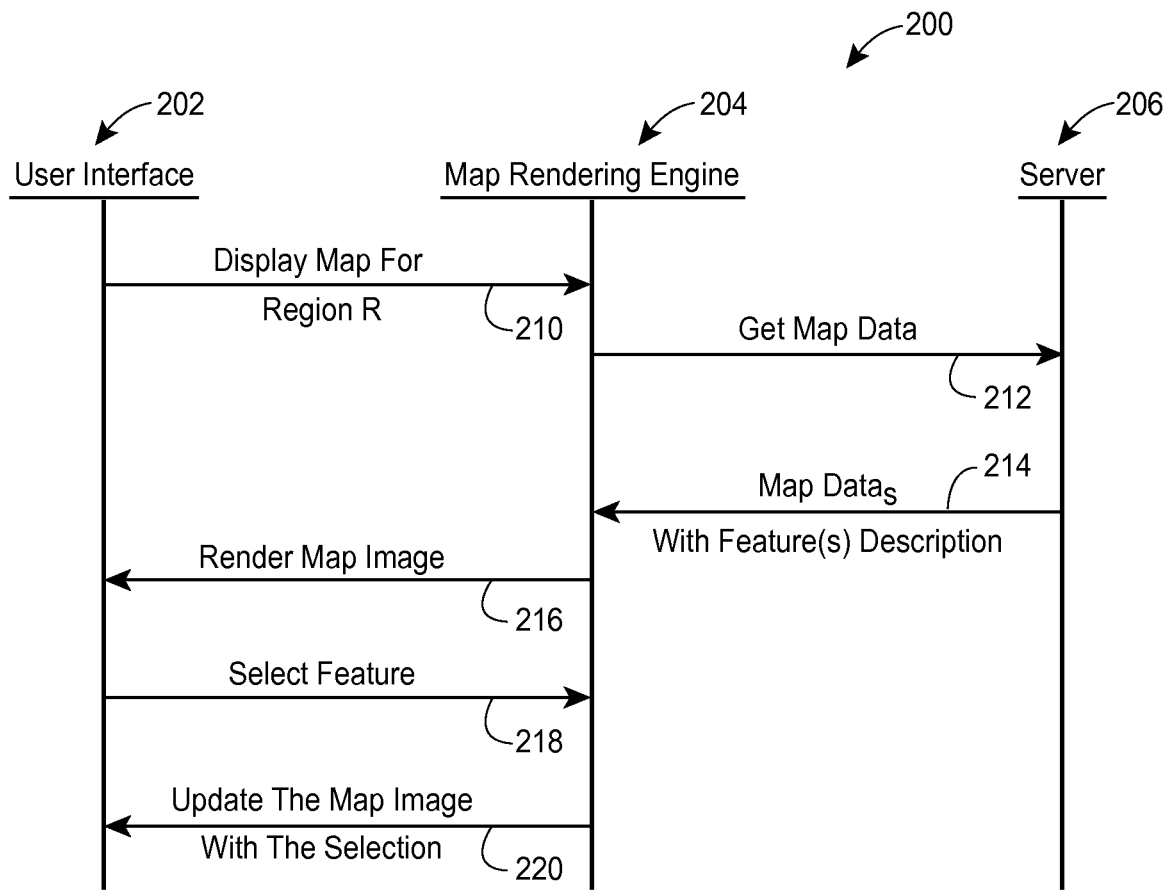
FIG. 4 is an interaction diagram that illustrates an example exchange of information for providing map data and a map feature description to a client device that may operate in the system of FIG. 1.

Next, an example exchange of information for rendering a map image that includes one or several aggregate map features is discussed with reference to FIG. 4. The message exchange 200 involves a user interface 202, included in or otherwise associated with a client device (such as the client 14 of FIG. 1), a map rendering engine 204 operating in the client device, and a server 206 (such as the map server 12 of FIG. 1). Referring back to FIG. 1, the user interface may be provided by the browser 60, while the dynamic map rendering engine 204 and the server 206 may be implemented in the components 62 and 12, respectively.

In response to a user command, the user interface 202 may generate a request 210 for map data for a certain region R and provide the request to the map rendering engine 204. The request 210 may be transmitted as an electronic message internal to the client device in which the components 202 and 204 are implemented, for example. In an embodiment, the request 210 specifies a zoom level and a map type (e.g., basic map). The dynamic map rendering engine 204 in turn may generate a request 212 for map data, to be transmitted via a communication network to the server 206. The request 212 may specify the region R using latitude and longitude (which may be obtained using a GPS device, for example) or in any other suitable manner.

In response to the request 212, the server 206 may generate a response 214 that includes map data in a non-raster format, such as in a vector graphics format, for rendering a map image. The response 114 may include map data that is organized in any suitable manner, such as in one or several tile descriptors $T_1, T_2, \ldots T_N$. In general, map data may be provided for any number of tiles, including a single tile. For each tile, the response 214 may describe various map elements or non-aggregate map features $F_1, F_2, \ldots F_M$, each of which may be specified using a vector descriptor in accordance with a suitable vector graphics format. In addition to the non-aggregate map features $F_1, F_2, \ldots F_M$, the response 214 may describe an aggregate map feature $F_A$ that includes two or more of the non-aggregate map features $F_1, F_2, \ldots F_M$. As discussed above, the description of the aggregate map feature $F_A$ may include an indication of which of the non-aggregate map features $F_1, F_2, \ldots F_M$ are associated with the map feature $F_A$, a unique feature identifier to identify the map feature $F_A$ in subsequent communications, a label to be displayed with the map feature $F_A$ under certain conditions, etc. The dynamic map rendering engine 204 may render the map image, provide the map image to the user interface 202, and generate a corresponding event 216. In some embodiments, the dynamic map rendering engine 204 may store the received map data (and, when available, style data) in a memory for future use.

At a later time, the user may select an aggregate map feature using an interactive control provided via the user interface 202. In response, the user interface 202 may generate an event 218 to indicate that a map feature has been selected. In an embodiment, the event 218 only specifies the location on the map image which the user has selected and indicates that the user wishes to select an aggregate map feature. The map rendering engine 204 may determine which map element the user has selected, automatically identify all other map elements associated with the same aggregate map feature, and update the map image to indicate that the map feature has been selected (event 220). For example, referring back to FIG. 3C, the event 220 may cause the map elements in the enclosed area to be highlighted.

Several example methods that may be implemented in computing devices operating in the system of FIG. 1 or a similar environment are discussed next with reference to FIGS. 5-7. These methods may be implemented as computer programs developed in any suitable programming language and stored on a tangible, non-transitory computer-readable medium (such as one or several hard disk drives) and executable on one or several processors. For example, the methods of FIGS. 5 and 6 may be implemented in the map server 12, and the method of FIG. 7 may be implemented in the client device 14. Although the methods of FIGS. 5-7 can be executed on individual computers, such as servers or personal computers (PCs), it is also possible to implement at least some of these methods in a distributed manner using several computers, e.g., in a cloud computing environment.

Figure 5:
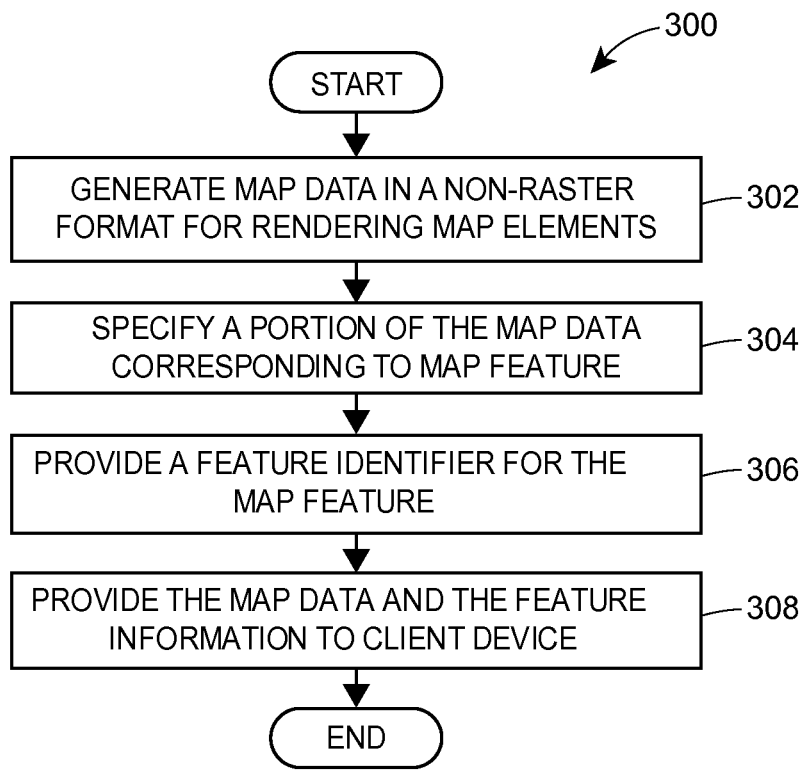
FIG. 5 is a flow diagram of an example method for generating map data and a map feature description at a map server that may operate in the system of FIG. 1.

Referring first to FIG. 5, an example method 300 for generating map data along with a description of an aggregate map feature may be implemented in the map controller 30 or 80, for example. According to an embodiment, map data in a non-raster format for rendering a first map image corresponding to a certain geographic region is generated at block 302. The map data may include vector descriptors, for example, that conform to a vector graphics format and describe respective map elements. In an embodiments, each vector descriptor defines a respective map feature. The map data may be provided as a data structure for transmission in an electronic message conforming to a certain format recognized by a map server and a client device.

Next, at block 304, a portion of the map data that corresponds to an aggregate map feature is specified. The aggregate map feature may include several non-aggregate map features, for example, as well as additional information such as a common label, a depth indication, etc. An indication of the portion of the map that corresponds to the map feature may be included in a descriptor of the map feature. At block 306, a unique feature identifier for the map feature is provided. In some cases, the unique feature identifier may be retrieved from a map database such as the database 18 of FIG. 1. In other cases, the unique feature identifier is generated during execution of the method 300. In any case, the unique feature identifier may be included in the descriptor of the map feature along with the indication generated at block 304.

At block 308, the map data and the description of the map feature are provided to the client device. For example, one or several electronic messages can be transmitted to the client device via a communication network.

Figure 6:
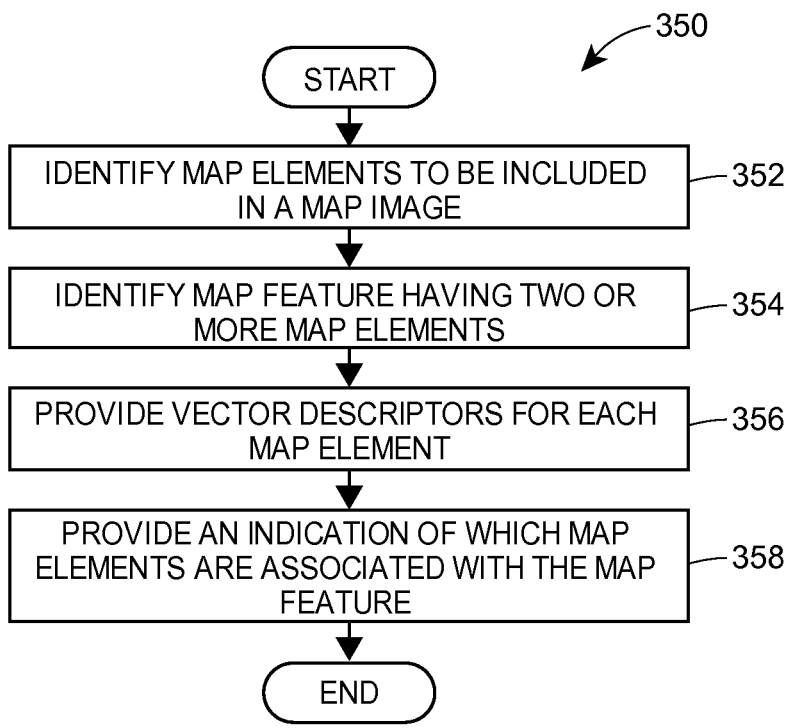
FIG. 6 is a flow diagram of an example method for generating a map feature description at a map server that may operate in the system of FIG. 1.

Now referring to FIG. 6, an example method 350 for generating a map feature description may be implemented in the map feature controller 86 or a similar module, for example. In an embodiment, at least some of the steps of method 350 are executed at blocks 304-306 of the method 300 discussed above.

At block 352, map elements to be included in a map image for a selected geographic area, zoom level, and map type are identified. An aggregate map feature that includes two or more map elements is then identified at block 354, and a vector description of each map element is provided at block 356. At block 358, an indication of which of the map elements identified at block 352 are associated with the map feature is generated. In one embodiment, each map element is provided as a non-aggregate map feature with a respective feature identifier, and the indication generated at block 358 includes a list of feature identifier. The list of feature identifiers may be provided along with the descriptors of individual map features or separately. In another embodiment, the indication generated at block 358 includes one or more flags that delimit a portion of a list of vector descriptors to indicate which of the vector descriptors are associated with an aggregate map feature.

Figure 7:
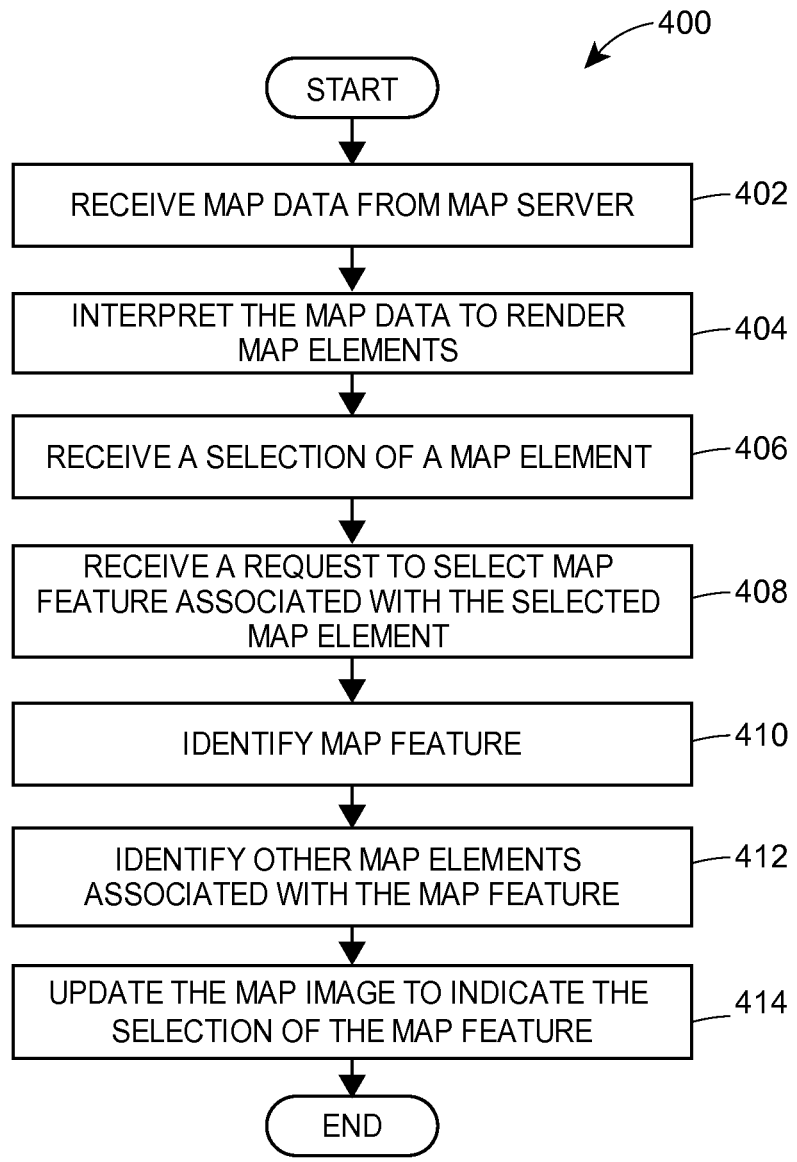
FIG. 7 is a flow diagram of an example method for processing map data and a map feature description at a client device that may operate in the system of FIG. 1.

FIG. 7 is a flow diagram of an example method 400 for processing map data and a map feature description at a client device. According to an embodiment, the method 400 is implemented in the client device 14 illustrated in FIG. 1.

At block 402, map data in a non-raster format is received from a map server. In an embodiment, the map data indicates which portion of the map data corresponds to an aggregate map feature. The map data is interpreted at block 404 to render various map elements. Next, at block 406, a certain map element is selected via a user interface. A user may, for example, click on or touch a certain building depicted in the map. A request to select a map feature associated with the selected map element is then received at block 408. In response, the method 400 identifies a map feature with which the selected map element is associated (block 410). At block 412, one or more additional map elements that are also associated with the map feature are identified. The map image is then updated at block 414 to reflect the automatic selection of multiple map elements associated with the aggregate map feature. For example, the map image may be updated to highlight all visible map elements that belong to the map feature.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. For example, the network 16 may include but is not limited to any combination of a LAN, a MAN, a WAN, a mobile, a wired or wireless network, a private network, or a virtual private network.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map rendering system for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system and a process for providing map and map feature data using the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a computing device for providing interactive map content via a user interface, the method comprising:
   rendering a plurality of individually renderable map elements, each representing a respective physical entity in a geographic area, to generate a digital map of the geographic area;
   receiving, by one or more processors, a description of an aggregate map feature that includes several but not all of the plurality of map elements, and wherein the several map elements represent physical entities with a preexisting logical relationship defining a common administrative unit;
   receiving, by the one or more processors, a selection of any one of the several map elements via the user interface;
   in response to receiving the selection, automatically selecting all of the several map elements included in the aggregate map feature, including providing an indication on the user interface that the aggregate map feature has been selected.

2. The method of claim 1, wherein providing the indication that the aggregate map feature has been selected includes providing an indication of a boundary of the aggregate map feature determined by respective geometries of the several map features.

3. The method of claim 2, wherein providing the indication that the aggregate map feature has been selected includes highlighting the several map features relative to other map features on the digital map.

4. The method of claim 1, further comprising:
   receiving the plurality of individually renderable map elements from a map server, including receiving an identifier for each of the map elements, and
   receiving an identifier of the aggregate map feature from the map server.

5. The method of claim 1, wherein the common administrative unit is an academic institution, and wherein the several map elements include map elements that represent buildings and map elements that represent pedestrian paths.

6. The method of claim 1, wherein the common administrative unit is a shopping mall, and wherein the several map elements include map elements that represent stores.

7. The method of claim 1, wherein the aggregate map feature spans multiple map tiles.

8. A non-transitory computer-readable medium storing thereon instructions for providing interactive map content via a user interface, wherein the instructions, when executed by one or more processors, cause the one or more processors to:
   receive map data that describes a plurality of map elements, each representing a respective physical entity in a geographic area, wherein the map data separately specifies respective geometry of each of the plurality of map elements;
   receive a description of an aggregate map feature that includes several but not all of the plurality of map elements, wherein the several map elements represent physical entities with a preexisting logical relationship defining a common administrative unit;
   render the map to generate a digital map of the geographic area for display via the user interface; and
   provide, via the user interface, a control for manipulating the several map elements of the aggregate map feature as a single map element.

9. The computer-readable medium of claim 8, wherein the user interface includes a touchscreen, and wherein the control is activated via a gesture applied to the touchscreen.

10. The computer-readable medium of claim 8, wherein the instructions further cause the one or more processors to highlight the several map features relative to other map features on the digital map in response to user activating the control.

11. The computer-readable medium of claim 10, wherein the instructions further cause the one or more processors to provide an indication of a boundary of the aggregate map feature determined by respective geometries of the several map features.

12. The computer-readable medium of claim 8, wherein the map includes respective identifiers for the plurality of map elements, and wherein the description of the aggregate map feature includes a separate identifier for the aggregate map feature.

13. The computer-readable medium of claim 8, wherein the common administrative unit is an academic institution, and wherein the several map elements include map elements that represent buildings and map elements that represent pedestrian paths.

14. The computer-readable medium of claim 8, wherein the aggregate map feature spans multiple map tiles.

15. A method in one or more computing devices for providing map data for generating interactive digital maps on client devices, the method comprising:
   receiving, from a client device, a request for map data for generating an interactive digital map of a geographic area;
   generating the map data including descriptions of geometries of a plurality of individually renderable map elements, each representing a respective physical entity in the geographic area;
   generating a description of an aggregate map feature, wherein the aggregate map feature includes several but not all of the plurality of map elements, wherein the several map elements represent physical entities with a preexisting logical relationship defining a common administrative unit; and
   transmitting the map data and the description of the aggregate map feature to the client device, wherein in response to a selection of any one of the several map elements via a client device user interface, the client device automatically selects all of the several map elements included in the aggregate map feature and provides an indication on the user interface that the aggregate map feature has been selected.

16. The method of claim 15, further comprising:
   transmitting, to the client device, respective identifiers for the plurality of individually renderable map elements; and
   providing, to the client device, an identifier of the aggregate map feature.

17. The method of claim 15, wherein the common administrative unit is an academic institution, and wherein the several map elements include map elements that represent buildings and map elements that represent pedestrian paths.

18. The method of claim 15, wherein the common administrative unit is a shopping mall, and wherein the several map elements include map elements that represent stores.

19. The method of claim 15, wherein generating the map data includes generating the descriptions of the geometries in a vector graphics format.

20. The method of claim 15, wherein each of the plurality of map elements is selected from a group including a road segment, a building, and a bounded area.

\* \* \* \* \*